(12) United States Patent
Huang et al.

(10) Patent No.: US 11,643,364 B2
(45) Date of Patent: May 9, 2023

(54) MAGNESIUM-BASED RAW MATERIAL WITH LOW THERMAL CONDUCTIVITY AND LOW THERMAL EXPANSION AND PREPARATION METHOD THEREOF

(71) Applicant: WUHAN UNIVERSITY OF SCIENCE AND TECHNOLOGY, Wuhan (CN)

(72) Inventors: Ao Huang, Wuhan (CN); Yanzhu Huo, Wuhan (CN); Huazhi Gu, Wuhan (CN); Yongshun Zou, Wuhan (CN); Lvping Fu, Wuhan (CN); Meijie Zhang, Wuhan (CN)

(73) Assignee: WUHAN UNIVERSITY OF SCIENCE AND TECHNOLOGY, Wuhan (CN)

( * ) Notice: Subject to any disclaimer, the term of this patent is extended or adjusted under 35 U.S.C. 154(b) by 3 days.

(21) Appl. No.: 17/346,233

(22) Filed: Jun. 12, 2021

(65) Prior Publication Data
US 2022/0089497 A1    Mar. 24, 2022

(30) Foreign Application Priority Data
Sep. 22, 2020   (CN) .......................... 202011001247.7

(51) Int. Cl.
 *C04B 35/043*   (2006.01)
 *C04B 35/626*   (2006.01)

(52) U.S. Cl.
 CPC .... *C04B 35/0435* (2013.01); *C04B 35/62615* (2013.01); *C04B 2235/3208* (2013.01); *C04B 2235/3244* (2013.01); *C04B 2235/5427* (2013.01); *C04B 2235/5436* (2013.01); *C04B 2235/5454* (2013.01); *C04B 2235/9607* (2013.01)

(58) Field of Classification Search
 CPC .......... C04B 35/0435; C04B 35/62615; C04B 2235/3208; C04B 2235/3244; C04B 2235/5427; C04B 2235/5436; C04B 2235/5454; C04B 2235/9607
 See application file for complete search history.

(56) References Cited

FOREIGN PATENT DOCUMENTS

JP            H0532454 A    *   2/1993

OTHER PUBLICATIONS

JPH0532454A machine translation (Year: 1993).*

* cited by examiner

*Primary Examiner* — Karl E Group
*Assistant Examiner* — Cameron K Miller
(74) *Attorney, Agent, or Firm* — Platinum Intellectual Property PC

(57) ABSTRACT

The present disclosure relates to a magnesium-based raw material and a preparation method thereof. According to the technical solution, 40-60 wt % fused magnesia particles, 30-40 wt % fine monoclinic zirconia powder, 5-20 wt % fine zirconium oxychloride powder, 0.5-1.5 wt % calcium hydroxide nanopowder, 0.2-0.5 wt % calcium hydroxide nanopowder, and 0.1-0.3 wt % maleic acid are stirred for 15 min to mix well in a high-speed mixing mill at a constant temperature of 25° C. to obtain a mixed powder; and the mixed powder is mixed through a ball mill at a constant temperature of 25° C. for 3 min, roasted in a high temperature furnace at 250-400° C. for 0.5-3 h, and finally cooled to room temperature.

6 Claims, No Drawings

MAGNESIUM-BASED RAW MATERIAL WITH LOW THERMAL CONDUCTIVITY AND LOW THERMAL EXPANSION AND PREPARATION METHOD THEREOF

RELATED APPLICATIONS

This application is a Non-provisional Application under 35 USC 111(a), which claims Chinese Patent Application No. 202011001247.7, filed Sep. 22, 2020, the disclosure of all of which are hereby incorporated by reference in their entirety.

TECHNICAL FIELD

The present disclosure belongs to the technical field of refractory materials, and in particular, relates to a magnesium-based raw material with low thermal conductivity and low thermal expansion and a preparation method thereof.

BACKGROUND ART

Refractory materials are directly used in high-temperature industrial production processes in various fields of the national economy such as steel, non-ferrous metals, cement, glass, ceramics, chemicals, machinery, and electricity. The refractory materials are essential to ensure the operation of the above-mentioned industries and technological development. With the advantages of high melting point, high temperature resistance, and excellent resistance to high temperature basic slag corrosion, magnesia is one of the most important raw materials in refractory materials and is widely used in various high temperature industrial refractory materials. The performance and service life of the magnesia are directly related to the normal operation of high-temperature industries and the quality of products.

Although magnesia has high refractoriness and good corrosion resistance to alkaline high-temperature slag, the thermal conductivity of the magnesia is still high, and the defects of poor resistance to high-temperature slag penetration and thermal shock resistance substantially limits the service life thereof. The resistance to high-temperature slag penetration and thermal shock resistance of magnesia are importantly related to microstructure thereof. The molten slag can easily penetrate into the material through pores and grain boundaries and thus cause serious erosion. Therefore, the existing magnesia preparation technology mostly tends to prepare large-grain and dense magnesia raw materials, namely large crystalline magnesia. However, due to the large thermal expansion coefficient of MgO, when large crystalline magnesia undergoes a drastic temperature change, the thermal stress is difficult to release due to the small number of grain boundaries, and the thermal shock resistance is usually poor. In addition, considering that the pore size in the existing magnesia is usually large and the degree of direct bonding is low, the development of microporous magnesia effectively reduces the pore size, increases the proportion of closed pores in the pores, and can alleviate the penetration and erosion of high temperature melt, but the balance between thermal insulation and slag resistance is still not superior and needs to be improved after the microporous magnesia becomes light-weight and porous.

SUMMARY

An objective of the present disclosure is to provide a method for preparing a magnesium-based raw material with low thermal conductivity and low thermal expansion that is simple in process and convenient for industrial production. The specific process includes the following steps:

stirring 40-60 wt % fused magnesia particles, 30-40 wt % fine monoclinic zirconia powder, 5-20 wt % fine zirconium oxychloride powder, 0.5-2 wt % calcium hydroxide nano-powder, 0.2-0.5 wt % of fine light calcined magnesia powder, and 0.1-0.3 wt % maleic acid to mix well in a high-speed mixing mill at a constant temperature of 25° C. for 15 min to obtain a mixed powder; and mixing the mixed powder through a ball mill at a constant temperature of 25° C. for 3 min, roasting in a high temperature furnace at 250-400° C. for 0.5-3 h, and cooling to room temperature to form a magnesium-based refractory material.

Preferably, the fused magnesia particles may be ≤1 mm in particle size, and MgO content in the fused magnesia particles may be ≥96 wt %.

Preferably, the fine monoclinic zirconia powder may be ≥45 µm in particle size, and $ZrO_2$ content in the fine monoclinic zirconia powder may be ≥98 wt %.

Preferably, the fine zirconium oxychloride powder may be ≤45 µm in particle size.

Preferably, the calcium hydroxide nanopowder may have $Ca(OH)_2$ content of ≥98 wt % and a particle size of ≤0.1 µm.

Preferably, the fine light calcined magnesia powder may have MgO content of ≥95 wt % and a particle size of ≤45 µm.

Another aspect of the present disclosure relates to a magnesium-based refractory material, and the magnesium-based refractory material is obtained according to the foregoing method for preparing a magnesium-based refractory material.

Due to the adoption of the above technical solutions, the present disclosure has the following positive effects compared with the prior art:

The present disclosure adopts a millimeter-micron-nano-sized particle composite system and a mixed milling and ball milling process. Combined with the pyrolysis of the fine zirconium oxychloride powder and calcium hydroxide nanopowder, the present disclosure may introduce and uniformly distribute micro-nano zirconia and calcium oxide (CaO) around the magnesia grain boundary. When the magnesium-based raw material is used at a high temperature, the phase change of zirconia and the stress generated by the reaction of zirconia with calcium oxide may promote the close contact of the micro-nano zirconia with the magnesia grain boundary, and in grain boundary impurities thereof, CaO may take priority over $SiO_2$ to react with these active $ZrO_2$ to form $CaZrO_3$ at the grain boundary; an appropriate amount of nano-sized $ZrO_2$ particles are coated with CaO with similar particle size and MgO micropowder with larger activity, hindering the aggregation reaction of the nano-sized $ZrO_2$ particles with CaO impurities in the grain boundary, stabilizing the structure of the magnesia, and having a sustained-release effect; these intercrystalline $CaZrO_3$ phases generated continuously may enhance the binding force of magnesia particles, effectively reduce the thermal conductivity and thermal expansion coefficient of the magnesia, and improve slag resistance.

It can be seen that the present disclosure has the characteristics of simple process and convenient industrial production; the prepared magnesium-based raw material with low thermal conductivity and low thermal expansion is characterized by relatively low thermal conductivity, low thermal expansion coefficient, excellent dispersibility, and strong resistance to slag penetration and erosion.

DETAILED DESCRIPTION OF THE EMBODIMENTS

The present disclosure will be further described in detail below in combination with embodiments, without limiting the protection scope thereof.

In order to avoid repetition, the materials involved in this DETAILED DESCRIPTION OF THE EMBODIMENTS are described in a unified manner as follows, which will not be repeated in the examples:

The fused magnesia particles are ≤1 mm in particle size, and MgO content in the fused magnesia particles is ≥96 wt %.

The fine monoclinic zirconia powder is ≤45 μm in particle size, and $ZrO_2$ therein is ≥98 wt %.

The fine zirconium oxychloride powder is ≤45 μm in particle size.

The calcium hydroxide nanopowder has $Ca(OH)_2$ content of ≥98 wt % and a particle size of ≤0.1 μm.

The fine light calcined magnesia powder has MgO content of ≥95 wt % and a particle size of ≤45 μm.

Example 1

40 wt % fused magnesia particles, 40 wt % fine monoclinic zirconia powder, 19 wt % fine zirconium oxychloride powder, 0.5 wt % calcium hydroxide nanopowder, 0.2 wt % fine light calcined magnesia powder, and 0.3 wt % maleic acid were stirred for 15 min to mix well in a high-speed mixing mill at a constant temperature of 25° C. to obtain a mixed powder; and the mixed powder was mixed through a ball mill at a constant temperature of 25° C. for 3 min, roasted in a high temperature furnace at 250° C. for 3 h, and cooled to room temperature to obtain a magnesium-based raw material with low thermal conductivity and low thermal expansion provided by the example.

Example 2

50 wt % fused magnesia particles, 35 wt % fine monoclinic zirconia powder, 13 wt % fine zirconium oxychloride powder, 1.4 wt % calcium hydroxide nanopowder, 0.5 wt % fine light calcined magnesia powder, and 0.1 wt % maleic acid were stirred for 15 min to mix well in a high-speed mixing mill at a constant temperature of 25° C. to obtain a mixed powder; and the mixed powder was mixed through a ball mill at a constant temperature of 25° C. for 3 min, roasted in a high temperature furnace at 400° C. for 0.5 h, and cooled to room temperature to obtain a magnesium-based raw material with low thermal conductivity and low thermal expansion provided by the example.

Example 3

60 wt % fused magnesia particles, 33 wt % fine monoclinic zirconia powder, 5 wt % fine zirconium oxychloride powder, 1.6 wt % calcium hydroxide nanopowder, 0.2 wt % fine light calcined magnesia powder, and 0.2 wt % maleic acid were stirred for 15 min to mix well in a high-speed mixing mill at a constant temperature of 25° C. to obtain a mixed powder; and the mixed powder was mixed through a ball mill at a constant temperature of 25° C. for 3 min, roasted in a high temperature furnace at 300° C. for 2.5 h, and cooled to room temperature to obtain a magnesium-based raw material with low thermal conductivity and low thermal expansion provided by the example.

Example 4

52 wt % fused magnesia particles, 40 wt % fine monoclinic zirconia powder, 5.2 wt % fine zirconium oxychloride powder, 2 wt % calcium hydroxide nanopowder, 0.5 wt % fine light calcined magnesia powder, and 0.3 wt % maleic acid were stirred for 15 min to mix well in a high-speed mixing mill at a constant temperature of 25° C. to obtain a mixed powder; and the mixed powder was mixed through a ball mill at a constant temperature of 25° C. for 3 min, roasted in a high temperature furnace at 350° C. for 2.5 h, and cooled to room temperature to obtain a magnesium-based raw material with low thermal conductivity and low thermal expansion provided by the example.

Example 5

45 wt % fused magnesia particles, 37 wt % fine monoclinic zirconia powder, 16 wt % fine zirconium oxychloride powder, 1.5 wt % calcium hydroxide nanopowder, 0.3 wt % fine light calcined magnesia powder, and 0.2 wt % maleic acid were stirred for 15 min to mix well in a high-speed mixing mill at a constant temperature of 25° C. to obtain a mixed powder; and the mixed powder was mixed through a ball mill at a constant temperature of 25° C. for 3 min, roasted in a high temperature furnace at 400° C. for 1.5 h, and cooled to room temperature to obtain a magnesium-based raw material with low thermal conductivity and low thermal expansion provided by the example.

Comparative Examples 1 to 5

In Comparative Examples 1 to 5, the fused magnesia particles, fine monoclinic zirconia powder, fine zirconium oxychloride powder, calcium hydroxide nanopowder, fine light calcined magnesia powder, and maleic acid were subject to the weight ratio and process conditions in Table 1.

TABLE 1

| The ratio of raw materials in Comparative Examples 1 to 5 | | | | | |
|---|---|---|---|---|---|
| | Comparative Example 1 | Comparative Example 2 | Comparative Example 3 | Comparative Example 4 | Comparative Example 5 |
| Fused magnesia particles | 75 | 20 | 10 | 65 | 35 |
| Fine monoclinic zirconia powder | 21 | 50 | 60 | 27 | 45 |
| Fine zirconium oxychloride powder | 2 | 24 | 30 | 3 | 18 |
| Calcium hydroxide nanopowder | 0.2 | 4 | 0 | 4 | 0.1 |

TABLE 1-continued

The ratio of raw materials in Comparative Examples 1 to 5

| | Comparative Example 1 | Comparative Example 2 | Comparative Example 3 | Comparative Example 4 | Comparative Example 5 |
|---|---|---|---|---|---|
| Fine light calcined magnesia powder | 0.8 | 1 | 0 | 1 | 1.9 |
| Maleic acid | 1 | 1 | 0 | 0 | 0 |
| Temperature (° C.) | 300 | 250 | 300 | 350 | 400 |
| Roasting time (h) | 3 | 2.5 | 2 | 2 | 1.5 |

TABLE 2

Comparison of performance indexes of raw materials in the examples of the present disclosure and Comparative Examples 1 to 5

| Solution | Thermal conductivity (W/mk) · (800° C.) | Thermal expansion coefficient (° C.$^{-1}$) |
|---|---|---|
| Comparative Example 1 | 8.6 | $13.5 \times 10^{-6}$ |
| Comparative Example 2 | 8.8 | $13.8 \times 10^{-6}$ |
| Comparative Example 3 | 9.2 | $14.3 \times 10^{-6}$ |
| Comparative Example 4 | 9.0 | $14.2 \times 10^{-6}$ |
| Comparative Example 5 | 8.7 | $13.9 \times 10^{-6}$ |
| Example 1 | 5.8 | $9.8 \times 10^{-6}$ |
| Example 2 | 5.9 | $9.9 \times 10^{-6}$ |
| Example 3 | 6.0 | $10 \times 10^{-6}$ |
| Example 4 | 5.9 | $9.8 \times 10^{-6}$ |
| Example 5 | 6.0 | $9.8 \times 10^{-6}$ |

The comparison of performance indexes of magnesium-based raw materials in all examples of the present disclosure versus traditional magnesium-based raw materials is shown in Table 2. From Tables 1 and 2, 40-60 wt % fused magnesia particles, 30-40 wt % fine monoclinic zirconia powder, 5-20 wt % fine zirconium oxychloride powder, 0.5-2 wt % calcium hydroxide nanopowder, 0.2-0.5 wt % fine light calcined magnesia powder, and 0.1-0.3 wt % maleic acid are stirred to mix well in a high-speed mixing mill at a constant temperature of 25° C. for 15 min to obtain a mixed powder, and both thermal conductivity and thermal expansion coefficient of the raw material obtained finally are far lower than those of traditional magnesium-based raw materials. There are the following reasons. The present disclosure adopts a millimeter-micron-nano-sized particle composite system and a mixed milling and ball milling process. Combined with the pyrolysis of the fine zirconium oxychloride powder and calcium hydroxide nanopowder, the present disclosure may introduce and uniformly distribute micro-nano zirconia and calcium oxide (CaO) around the magnesia grain boundary. When the magnesium-based raw material is used at a high temperature, the phase change of zirconia and the stress generated by the reaction of zirconia with calcium oxide may promote the close contact of the micro-nano zirconia with the magnesia grain boundary, and in grain boundary impurities thereof, CaO may take priority over $SiO_2$ to react with these active $ZrO_2$ to form $CaZrO_3$ at the grain boundary; an appropriate amount of nano-sized $ZrO_2$ particles are coated with CaO with similar particle size and MgO micro-powder with larger activity, hindering the aggregation reaction of the nano-sized $ZrO_2$ particles with CaO impurities in the grain boundary, stabilizing the structure of the magnesia, and having a sustained-release effect; these intercrystalline $CaZrO_3$ phases generated continuously may enhance the binding force of magnesia particles, effectively reduce the thermal conductivity and thermal expansion coefficient of the magnesia, and improve slag resistance.

Therefore, the present disclosure has the characteristics of simple process and convenient industrial production; the prepared magnesium-based raw material with low thermal conductivity and low thermal expansion is characterized by relatively low thermal conductivity, low thermal expansion coefficient, excellent dispersibility, and strong resistance to slag penetration and erosion.

The present disclosure has been described in detail above with reference to general descriptions and specific examples, but it will be apparent to those skilled in the art that some modifications or improvements can be made based on the present disclosure. Therefore, all these modifications or improvements made without departing from the spirit of the present disclosure fall within the scope of the present disclosure.

What is claimed is:

1. A method for preparing a magnesium-based raw material comprising:
   stirring 40-60 wt % fused magnesia particles, 30-40 wt % fine monoclinic zirconia powder, 5-20 wt % fine zirconium oxychloride powder, 0.5-2 wt % calcium hydroxide nanopowder, 0.2-0.5 wt % of fine light calcined magnesia powder, and 0.1-0.3 wt % maleic acid to mix well in a high-speed mixing mill at a constant temperature of 25° C. for 15 min to obtain a mixed powder; and
   mixing the mixed powder through a ball mill at a constant temperature of 25° C. for 3 min, roasting in a high temperature furnace at 250-400° C. for 0.5-3 h, and cooling to room temperature to form the magnesium-based raw material.

2. The method for preparing a magnesium-based raw material according to claim 1, wherein the fused magnesia particles is ≤1 mm in particle size, and MgO content in the fused magnesia particles is ≥96 wt %.

3. The method for preparing a magnesium-based raw material according to claim 1, wherein the fine monoclinic zirconia powder is ≤45 μm in particle size, and $ZrO_2$ content in the fine monoclinic zirconia powder is ≥98 wt %.

4. The method for preparing a magnesium-based raw material according to claim 1, wherein the fine zirconium oxychloride powder is ≤45 μm in particle size.

5. The method for preparing a magnesium-based raw material according to claim 1, wherein the calcium hydroxide nanopowder has $Ca(OH)_2$ content of ≥98 wt % and a particle size of ≤0.1 μm.

6. The method for preparing a magnesium-based raw material according to claim 1, wherein the fine light calcined magnesia powder has MgO content of ≥95 wt % and a particle size of ≤45 μm.

* * * * *